United States Patent
Bares et al.

(10) Patent No.: US 12,260,207 B2
(45) Date of Patent: Mar. 25, 2025

(54) APPLYING SERVICE LEVEL OBJECTIVES TO RELEASE PIPELINES

(71) Applicant: Microsoft Technology Licensing, LLC, Redmond, WA (US)

(72) Inventors: Jeremy Michael Bares, Seattle, WA (US); Havva Gulay Gurbuz, Issaquah, WA (US); Marc Van Eijk, Zuid-Holland (NL); Rajive Kumar, Sammamish, WA (US); Jay Christopher Svoboda, Seattle, WA (US); Kiran Belthur Parthasarathy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 17/855,123

(22) Filed: Jun. 30, 2022

(65) Prior Publication Data
US 2024/0004630 A1    Jan. 4, 2024

(51) Int. Cl.
  *G06F 8/65*  (2018.01)
(52) U.S. Cl.
  CPC ...................... *G06F 8/65* (2013.01)
(58) Field of Classification Search
  CPC .......................................... G06F 8/65
  USPC .......................................... 717/168
  See application file for complete search history.

(56) References Cited

U.S. PATENT DOCUMENTS

| | | | | |
|---|---|---|---|---|
| 8,135,775 B1* | 3/2012 | Anderson | ................ | G06F 8/61 |
| | | | | 709/248 |
| 9,787,779 B2* | 10/2017 | Frank | ................ | G06F 11/3409 |
| 10,146,524 B1* | 12/2018 | Killmon | ................ | G06F 8/65 |
| 10,228,936 B2* | 3/2019 | Suparna | ................ | G06F 8/77 |
| 10,565,093 B1* | 2/2020 | Herrin | ................ | G06F 8/77 |
| 10,585,656 B1* | 3/2020 | Das | ................ | G06F 8/61 |
| 10,671,368 B2* | 6/2020 | Brealey | ................ | G06F 11/3688 |
| 10,733,010 B2* | 8/2020 | Kasha | ................ | G06F 9/46 |
| 10,838,833 B1* | 11/2020 | Jibaja | ................ | G06F 11/2094 |
| 11,030,071 B2* | 6/2021 | Mosquera | ................ | H04L 41/5003 |
| 11,036,483 B2* | 6/2021 | Veljanoski | ................ | G06F 8/71 |
| 11,151,020 B1* | 10/2021 | Bajoria | ................ | G06F 9/54 |
| 11,733,998 B2* | 8/2023 | Sasikumar | ................ | G06F 8/60 |
| | | | | 717/170 |
| 11,875,288 B2* | 1/2024 | Sailer | ................ | G06Q 10/06313 |

(Continued)

OTHER PUBLICATIONS

Shijimol Ambi Karthikeyan; "Demystifying the Azure Well-Architected Framework: Guiding Principles and Design Best Practices for Azure Workloads"—2021.*

(Continued)

*Primary Examiner* — Francisco J Aponte
(74) *Attorney, Agent, or Firm* — RAY QUINNEY & NEBEKER; Tiffany Healy (57) ABSTRACT

The present disclosure relates to methods and systems for monitoring release pipelines. The methods and systems calculate health metrics of release pipelines using telemetry data from the release pipelines. The methods and systems determine whether the release pipelines are healthy based on the health metrics. The methods and systems automatically trigger one or more actions in response to determining that the release pipelines are unhealthy and continue to monitor the release pipelines in response to determining that the release pipelines are healthy.

19 Claims, 7 Drawing Sheets

(56) References Cited

U.S. PATENT DOCUMENTS

| | | | |
|---|---|---|---|
| 2016/0132324 A1* | 5/2016 | Elder | G06F 8/70 717/170 |
| 2017/0180459 A1* | 6/2017 | Frank | H04L 41/0866 |
| 2018/0157466 A1* | 6/2018 | Jubran | G06F 8/00 |
| 2019/0129701 A1* | 5/2019 | Hawrylo | G06F 8/71 |
| 2019/0129712 A1* | 5/2019 | Hawrylo | G06F 8/20 |
| 2019/0138288 A1* | 5/2019 | Brealey | G06F 11/3688 |
| 2019/0361688 A1* | 11/2019 | Chigakkagari | G06F 11/302 |
| 2019/0361697 A1* | 11/2019 | Hu | G06F 8/433 |
| 2020/0218622 A1* | 7/2020 | Zhang | G06F 11/2257 |
| 2020/0310769 A1* | 10/2020 | Veljanoski | G06F 8/70 |
| 2021/0349759 A1* | 11/2021 | Bansal | G06F 9/5083 |
| 2021/0349814 A1* | 11/2021 | Joshi | G06F 11/3688 |
| 2022/0164171 A1* | 5/2022 | Johnson | G06F 8/77 |
| 2022/0303295 A1* | 9/2022 | Erlingsson | G06F 16/9038 |
| 2022/0413983 A1* | 12/2022 | Mathew | G06F 9/5022 |
| 2023/0028146 A1* | 1/2023 | Harwood | G06F 11/3692 |
| 2023/0045235 A1* | 2/2023 | Pierscieniak | G06F 8/65 |
| 2023/0086361 A1* | 3/2023 | Wan | G06F 11/1433 702/186 |
| 2023/0214233 A1* | 7/2023 | Darji | G06F 9/4451 713/1 |
| 2023/0237366 A1* | 7/2023 | Leung Pah Hang | G06N 20/00 706/12 |
| 2023/0275917 A1* | 8/2023 | Karmali | G06F 16/9537 709/224 |
| 2024/0004630 A1* | 1/2024 | Chandra | G06F 8/65 |
| 2024/0012884 A1* | 1/2024 | Heim | G06F 8/65 |
| 2024/0289264 A1* | 8/2024 | Desai | G06F 11/3692 |

OTHER PUBLICATIONS

Bououni, et al., "Release deployment control using gates", Retrieved from: https://docs.microsoft.com/en-us/azure/devops/pipelines/release/approvals/gates?view=azure-devops, Apr. 6, 2022, 6 Pages.

* cited by examiner

| Release # | Stage A | Stage B | Stage C | Stage D | Stage E |
|---|---|---|---|---|---|
| 5 | Y | R | N | N | N |
| 4 | Y | Y | R | N | N |
| 3 | Y | Y | Y | R | N |
| 2 | Y | Y | Y | Y | R |
| 1 | Y | Y | Y | Y | Y |

Drift Score For Release #5

204

| | Stage A | Stage B | Stage C | Stage D | Stage E |
|---|---|---|---|---|---|
| Drift | 0 | 1 | 2 | 3 | 4 |
| Acceptable Drift | 0 | 1 | 2 | 3 | 4 |
| Drift Score | 0 | 1 | 1 | 1 | 1 |

206 — Drift Score: 4 (Sum of drift scores of all stages above)

| Release - 168 | A | B | C | D | E | F | G | H | I | J | K | L | M | N |
|---|---|---|---|---|---|---|---|---|---|---|---|---|---|---|
| Drift | 0 | 0 | 0 | 0 | 0 | 5 | 0 | 0 | 5 | 0 | 0 | 5 | 5 | 5 |
| Acceptable Drift | 0 | 0 | 1 | 2 | 3 | 4 | 4 | 4 | 4 | 5 | 5 | 5 | 5 | 5 |
| Drift Score |  |  | 0 | 0 | 0 | 1.3 | 0 | 0 | 1.3 | 0 | 0 | 1 | 1 | 1 |

FIG. 3B

| Release - 173 | A | B | C | D | E | F | G | H | I | J | K | L | M | N |
|---|---|---|---|---|---|---|---|---|---|---|---|---|---|---|
| Drift | 0 | 0 | 0 | 0 | 0 | 10 | 0 | 5 | 10 | 5 | 5 | 10 | 10 | 10 |
| Acceptable Drift | 0 | 0 | 1 | 2 | 3 | 4 | 4 | 4 | 4 | 5 | 5 | 5 | 5 | 5 |
| Drift Score |  |  | 0 | 0 | 0 | 2.5 | 0 | 1.3 | 2.5 | 1 | 1 | 2 | 2 | 2 |

FIG. 3C

| Release - 177 | A | B | C | D | E | F | G | H | I | J | K | L | M | N |
|---|---|---|---|---|---|---|---|---|---|---|---|---|---|---|
| Drift | 0 | 0 | 2 | 4 | 4 | 14 | 4 | 9 | 14 | 9 | 9 | 14 | 14 | 14 |
| Acceptable Drift | 0 | 0 | 1 | 2 | 3 | 4 | 4 | 4 | 4 | 5 | 5 | 5 | 5 | 5 |
| Drift Score |  |  | 2 | 2 | 1.3 | 3.5 | 1 | 2.3 | 3.5 | 1.8 | 1.8 | 2.8 | 2.8 | 2.8 |

APPLYING SERVICE LEVEL OBJECTIVES TO RELEASE PIPELINES

BACKGROUND

A product can include many micro-services, and products built from a micro-service pattern have multiple independent releases provided by release pipelines. Managing the health of these release pipelines is challenging and time intensive. Previously, engineering teams had to manually monitor release pipelines in order to identify when and where to apply resources to fix underperforming and unhealthy releases. Existing solutions focus on the health of a single release in a release pipeline by tracking service centric metrics.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes calculating health metrics of a release pipeline comprising a stage using telemetry data from the release pipeline, wherein the telemetry data is obtained during execution of the release by the release pipeline. The method includes determining that the release pipeline is unhealthy based on the health metrics. The method includes triggering an action in response to determining that the release pipeline is unhealthy.

Some implementations relate to a device. The device includes one or more processors; memory in electronic communication with the one or more processors; and instructions stored in the memory, the instructions executable by the one or more processors to: calculate health metrics of a release pipeline comprising a stage using telemetry data from the release pipeline, wherein the telemetry data is obtained during execution of the release by the release pipeline; determine that the release pipeline is unhealthy based on the health metrics; and trigger an action in response to determining that the release pipeline is unhealthy.

Some implementations relate to a method. The method includes executing a plurality of releases on a plurality of release pipelines. The method includes calculating health metrics for each release pipeline using telemetry from each release pipeline. The method includes performing an action in response to determining that a release pipeline of the plurality of release pipelines is unhealthy based on the health metrics.

Some implementations relate to a device. The device includes one or more processors; memory in electronic communication with the one or more processors; and instructions stored in the memory, the instructions executable by the one or more processors to: execute a plurality of releases on a plurality of release pipelines; calculate health metrics for each release pipeline using telemetry from each release pipeline; and perform an action in response to determining that a release pipeline of the plurality of release pipelines is unhealthy based on the health metrics.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. Understanding that the drawings depict some example implementations, the implementations will be described and explained with additional specificity and detail through the use of the accompanying drawings in which.

DETAILED DESCRIPTION

This disclosure generally relates to release pipelines. Products built from a micro-service pattern have multiple independent releases provided by release pipelines. A micro-service is where the domain of a product is broken into well-defined roles. Each domain of the product is an independent service. A service is software managed for a user by a company. A product is the end experience of a service that a user interacts with. A product may consists of multiple services. The services work together and makeup the entirety of the product. A monolith is a single service containing all domains to fulfill a product's needs. A product can include many micro-services (e.g., 10's to 100's of micro-services). Managing the health of these release pipelines (as opposed a release of a particular service) is challenging and time intensive. A release is a version of software delivered to end users. Currently, there is no efficient way for an engineering team to know when and where to apply resources to fix underperforming and unhealthy release pipelines. An engineering team is the team responsible for taking built code for a service and deploying the code across an environment. An example of an engineering team includes the developers responsible for building the service. Another example of an engineering team includes a software development and information technology (IT) operations (DevOps) team responsible for deploying the service. Multiple engineering teams may be responsible for a service.

Existing solutions focus on the health of a single release in a release pipeline by tracking service centric metrics. This enables the engineering team to automatically stop the deployment of a single release, but it does not enable the engineering team to infer broader health of the release pipeline over time. The service centric metrics also require each team owning the release to instrument and define metrics. Such service centric metrics may not be comparable between services.

The methods and systems of the present disclosure are directed to an end-to-end release process for a service to be deployed across a range of environments. The described methods and systems include calculating health metrics of a release pipeline using telemetry data from the release pipeline and determining whether the release pipeline is healthy based on the health metrics. These methods and systems include a release pipeline health model that takes into account latency (duration in time it takes a release instance of a release to go from test to the last stage of a release pipeline), success rate (rate of success per release in a release pipeline relative to total number of releases in the given release pipeline), throughput (count of release instances in a release making it to the last stage of the release pipeline over a duration of time), and drift (recency of the release instance relative to a release instance which is deployed to a last stage of the release pipeline). A release instance or single release is a run of a release pipeline. A stage is a job unit in a release.

The data-based health model of the present disclosure enables integration with monitoring solutions and automatically generates alerts based on thresholds. Autonomous operations may also be triggered based on the data-based health model. For example, an autonomous operation may block commits of further changes when the drift score falls below a pre-set value, enabling the release pipeline to catchup and reducing risk of developing against a code base that has not been validated in production.

One technical advantage of the methods and systems of the present disclosure is establishing release pipeline metrics and automatically applying the release pipeline metrics by the release pipeline platform. Any engineering teams using the release pipeline platform receives the release pipeline metrics without having to instrument code. By standardizing the release pipeline metrics, consumption of the release pipeline metrics is implicit and standard across all engineering teams leveraging the given platform. Moreover, if the release pipeline platform is providing consistent and pre-instrumented metrics, the metrics can be used to rate different engineering teams because the metrics are a known quantity. Another technical advantage the of the methods and systems of the present disclosure is releasing service updates quicker and with a higher quality.

Another technical advantage of the methods and systems of the present disclosure is providing information about a drift of a release, and thus, providing insights to whether the end users are receiving the latest features that have been developed. With services scaling to various geographic regions, it becomes difficult to monitor releases for each service or product to the different geographic regions. Thus, another technical advantage of the methods and systems of the present disclosure is consolidating monitoring of release pipelines of different services or products for different geographic regions.

As such, the method and systems of the present disclosure help engineering teams understand how the release deploying any changes or updates to a product or service is performing by providing a health monitoring model that evaluates a health of the release pipelines for the releases and triggers one or more actions to take in response to determining that the release pipelines are unhealthy.

Figure 1:
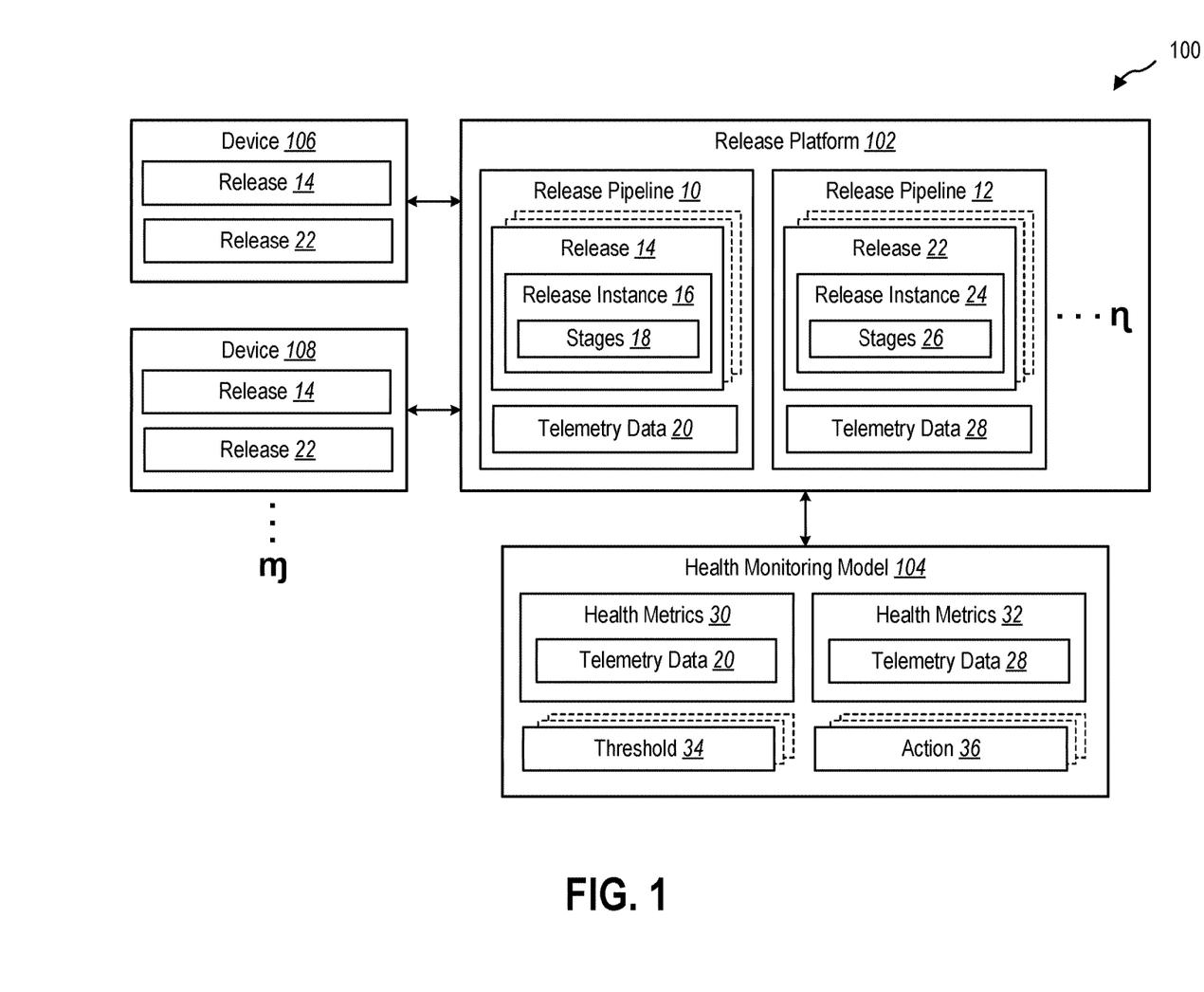
FIG. 1 illustrates an example environment for monitoring release pipelines in accordance with implementations of the present disclosure.

Referring now to FIG. 1, illustrated is an example environment 100 for monitoring release pipelines 10, 12. The environment 100 includes a release platform 102 with a plurality of release pipelines 10, 12 up to n (where n is a positive integer) that provides an end-to-end release process for a service or a product to be deployed across a range of environments. A service includes one or more services. As such, the end unit of all the services working together is the product the users experience using, for example, the devices 106, 108. Each release pipeline 10, 12 corresponds to a release 14, 22 being delivered to one or more devices 106, 108 up to m (where m is a positive integer). The releases 14, 22 are a version of software for the service or the product delivered to the end users of the devices 106, 108. For example, the release pipeline 10 is deploying the release 14 to the devices 106, 108 and the release pipeline 12 is deploying the release 22 to the devices 106, 108.

Different devices 106, 108 may receive different releases 14, 22. For example, in some embodiments, the device 106 receives release 14 and the device 108 receives the release 22. In some implementations, all of the devices 106, 108 receive the same releases 14, 22. The devices 106, 108 may be in different geographic regions. As such, the release platform 102 may communicate with a plurality of devices 106, 108 via a network. The network may include one or more networks that use one or more communication platforms or technologies for transmitting data. For example, the network may include the internet or other data link that enables transport of electronic data between respective devices of the environment 100.

Each service may have an independent release pipeline 10, 12. For example, release pipeline 10 is for Service A and release pipeline 12 is for Service B. As such, different services have separate release pipelines 10, 12 that are independent from each other. In some implementations, each release pipeline 10, 12 is a unit (e.g., a micro-service) of a broader product that is made up of a plurality of services. Each product with a plurality of services has a plurality of release pipelines where each release pipeline 10, 12 corresponds to a service of the plurality of services. In some implementations, each release pipeline 10, 12 is a whole product. As such, the release platform 102 includes a plurality of release pipelines 10, 12 where each release pipeline 10, 12 delivers a different service to the devices 106, 108 via the releases 14, 22.

Each release 14, 22 has a release instance 16, 24 that is a run of the release pipeline 10, 12. Each release instance 16, 24 includes a plurality of stages 18, 26 with one or more tasks to complete during each stage 18, 26. Different release instances 16, 24 may include a different number of stages 18, 26. For example, the release instance 16 includes 60 stages 18 and the release instance 24 includes 15 stages 26. Moreover, each service or product may include a plurality of releases 14, 22. One example use case includes a product including 14 independent releases 14, 22.

Each release pipeline 10, 12 may be predefined with the releases 14, 22 and the number of stages 18, 26 included in the release 14, 22. For example, an engineering team of the service defines the release pipelines 10, 12 and the number of stages 18, 26 included in the release 14, 22. As such, the release platform 102 is sending out various releases 14, 22 for products and services.

Telemetry data 20, 28 is emitted from each release pipeline 10, 12 during an execution of the release instance 16, 24 with information for the release instance 16, 24. In some implementations, the telemetry data 20, 28 is captured by the release platform 102. In some implementation, the telemetry data 20, 28 is captured by a health monitoring model 104. For example, the telemetry data 20, 28 indicates a start time of the release instance 16, 24 and an end time of the release instance 16, 24. Another example of the telemetry data 20, 28 includes success and/or failure telemetry of the release instance 16, 24. For example, whether the stages 18, 26 are successfully completed, the stages 18, 26 are still in progress, and/or the stages 18, 26 are not completed for the release instance 16, 24.

The telemetry data 20, 28 is provided to the health monitoring model 104 that calculate health metrics 30, 32 for the release pipelines 10, 12 using the telemetry data 20, 28. The health metrics 30, 32 provide different information that is used to determine an overall health of the release pipelines 10, 12. The health monitoring model 104 may calculate a variety of health metrics 30, 32 of the release pipelines using the telemetry data 20, 28. As such, the telemetry data 20, 28 is used by the health monitoring model 104 to measure a health of the release pipelines 10, 12. In some implementations, the health monitoring model 104 is part of the release platform 102. In some implementations, the health monitoring model 104 is remote from the release platform 102.

The health metrics 30, 32 calculated for the release pipelines 10, 12 may include a latency of the release instances 16, 24. The latency is the duration in time it takes a release instance 16, 24 to go from a first stage (e.g., the stages 18, 26) to a last stage (e.g., the stages 18, 26) of the release pipeline 10, 12. The health monitoring model 104 uses the telemetry data 20, 28 to determine the latency of the release instances 16, 24.

An example equation used by the health monitoring model 104 for calculating the latency is:

$$\text{Latency}_{ri} = \text{DateTime of stage } A - \text{DateTime of stage } B \quad (1)$$

where ri is the release instance (e.g., the release instances 16, 24), A is the last stage of the ri, and B is the first stage of the ri. The latency is calculated for the release instances 16, 24 that complete the last stage of the release 14, 22. If the release instance 16, 24 completes the last stage of the release 14, 22, the latency is used by the health monitoring model 104 to identify a duration in time to complete all of the stages 18, 26 in the release 14, 22 for the release instance 16, 24. If the release instance 16, 24 is unable to complete the last stage of the release 14, 22, the latency for the release instance 16, 24 may not be calculated by the health monitoring model 104.

The health metrics 30, 32 calculated for the release pipelines 10, 12 may also include a success rate of the release 14, 22. The success rate is the rate of successful stages per release instance 16, 24 relative to total number of stages in the given release instance 16, 24. The health monitoring model 104 uses the telemetry data 20, 28 to determine the success rate of the release instances 16, 24.

An example equation used by the health monitoring model 104 for calculating the success rate is:

$$\text{SuccessRate}_{ri} = \frac{\text{Total number of successful stages in } ri}{\text{Total number of stages in } ri} \quad (2)$$

where ri is the release instance (e.g., the release instances 16, 24). The health monitoring model 104 uses the success rate to indicate for a given release instance 16, 24, a success rate of the completed stages 18, 26 for the release instance 16, 24. One example use case includes a release instance with 10 stages and a success rate of 50% where 5 of the stages completed successfully and 5 of the stages were unable to complete.

The health metrics 30, 32 calculated for the release pipelines 10, 12 may also include a throughput of the release instances 16, 24. The throughput is the count of release instances 16, 24 in a release 14, 22 making it to the last stage of the release pipeline 10, 12 over a duration of time. The health monitoring model 104 uses the telemetry data 20, 28 to determine the throughput of the release instances 16, 24.

An example equation used by the health monitoring model 104 for calculating the throughput is:

$$\text{Throughput}_R = \text{number of instances in } R \text{ making it to the last stage during a duration of time} \quad (3)$$

where R is a release pipeline 10, 12. The health monitoring model 104 uses the throughput of the release instances 16, 24 to determine a number of release instances 16, 24 that complete the last stage 18, 26 of the release pipeline 10, 12 within a time period.

The health metrics 30, 32 calculated for the release pipelines 10, 12 may also include a drift score of the release instance 16, 24. The drift score is the recency of the release instance 16, 24. The health monitoring model 104 uses the telemetry data 20, 28 to calculate the drift score of the release instance 16, 24.

Example equations used by the health monitoring model 104 for calculating the drift score include:

$$\text{Drift}_r = \text{latest release \# successful in First Stage} - \text{latest release \# successful in stage } r \quad (4)$$

$$\text{Acceptable Drift}_r = \text{number of stages between } r \text{ and First Stage} \quad (5)$$

$$\text{Drift Score}_{ri} = \sum_r^{r \text{ in } R} \frac{\text{Drift}_r}{\text{Acceptable Drift}_r} \quad (6)$$

where ri is a release instance 16, 24 and R is a set of stages 18, 26 in ri, where ri is the release instance (e.g., the release instances 16, 24). The health monitoring model 104 uses the drift score to determine a recency of the release instance 16, 24 and identify whether the release 14, 24 is behind or operating as expected.

The health monitoring model 104 compares the health metrics 30, 32 to one or more thresholds 34 to evaluate an overall health of the release pipelines 10, 12. The thresholds 34 may be defined by engineering teams of a product to indicate whether a release 14, 22 is performing as expected (e.g., the latest versions of the service or product are being released by the release pipelines 10, 12 in a timely manner to the devices 106, 108). The thresholds 34 may differ between different products or services. In addition, the thresholds 34 may change for different releases 14, 22. As such, the thresholds 34 may be configurable for each service or product and/or each release 14, 22.

In some implementations, different weights are applied to the different health metrics 30, 32 giving more importance to specific health metrics 30, 32 relative to other health metrics 30, 32. For example, in some embodiments, the drift score has a higher weight relative to the success rate. In another example, the latency has a lower weight relative to the throughput. The weights may be determined based on goals or objectives of a product team and how the product team views a healthy release pipeline 10, 12.

In some implementations, different thresholds 34 are defined for different health metrics 30, 32. For example, one threshold 34 is defined for latency and a different threshold 34 is defined for drift score. In some implementations, a single threshold 34 is defined for an aggregate score of the health metrics 30, 32.

The health monitoring model 104 compares the health metrics 30, 32 to the threshold(s) 34 to determine whether the release pipelines 10, 12 are operating in a healthy manner. A healthy release pipeline 10, 12 is a release pipeline 10, 12 that is operating at or above an expected level. The thresholds 34 are used by the health monitoring model 104 to determine whether the release pipelines 10, 12 are operating as expected. In some implementations, if the health metrics 30, 32 are below or equal to the thresholds 34, the health monitoring model 104 determines that the release pipelines 10, 12 are operating as expected (e.g., the latest versions of the service are being released by the release pipelines 10, 12 in a timely manner to the devices 106, 108). For example, if the health metrics 30, 32 for the drift score are below the threshold 34 set for the drift score, the health metrics 30, 32 may indicate that the release pipelines 10, 12 are operating as expected and the latest versions of the service are being released in a timely manner. In some implementations, if the health metrics 30, 32 are above the thresholds 34, the health monitoring model 104 determines that the release pipelines 10, 12 are operating as expected. For example, if the health metrics 30, 32 for the success rate exceed the thresholds 34, the health metrics 30, 32 may indicate that the stages of the releases are successful and the release pipelines 10, 12 are operating as expected.

In some implementations, if the health metrics 30, 32 exceed the thresholds 34, the health monitoring model 104 determines that the release pipelines 10, 12 are not operating as expected (e.g., the latest versions of the service or product are unable to reach the devices 106, 108 or unable to reach the devices 106, 108 in a timely manner). In some implementations, if the health metrics 30, 32 are below the thresholds 34, the health monitoring model 104 determines that the release pipelines 10, 12 are not operating as expected. For example, if the threshold 34 for the success rate is 90% and the health metrics 30 indicates that the release pipeline 10 has a 70% success rate, the health monitoring model 104 determines that the release pipeline 10 is unhealthy because the success rate is below the threshold 34. However, if the health metrics 32 indicates that the release pipeline 12 has a 92% success rate, the health monitoring model 104 may determine that the release pipeline 12 is healthy because the success rate is above the threshold 34.

The health monitoring model 104 may cause one or more actions 36 to be performed in response to the health metrics 30, 32 indicating that the release pipelines 10, 12 are unhealthy. In some implementations, the actions 36 are automatically performed by the health monitoring model 104 or other systems in the environment 100. As such, the health monitoring model 104 may leverage the health metrics 30, 32 to trigger autonomous actions 36 on the release pipelines 10, 12.

One example action 36 includes sending an alert with a notification indicating that the release pipelines 10, 12 are unhealthy. For example, the health monitoring model 104 sends one or more alerts to the engineering team of the product or service indicating that the release pipelines 10, 12 are unhealthy in response to determining that the health metrics 30, 32 indicate that the release pipelines are unhealthy. In some implementations, the alert identifies which health metric 30, 32 exceeded the threshold level. One example includes the alert identifying that the drift score is above the threshold 34. Another example includes the alert identifying that the latency is above the threshold 34. Another example includes the alert identifying that the success rate is below the threshold 34. As such, the alert identifies which areas of the release pipeline 10, 12 may need attention.

Another example action 36 includes automatically making gate(s) at the production level to prevent any more releases 14, 22 until the service is fixed provided by the release pipeline 10, 12 in response to determining that the health metrics 30, 32 indicate that the release pipelines 10, 12 are unhealthy. One example includes if the underlying infrastructure is unstable, fixing the service includes adding resiliency to the service. Another example includes if the service code has a bug, fixing the service includes applying a code fix for the bug. For example, if one or more of the health metrics 30, 32 fall into an undesired value set, the action 36 includes blocking merging changes of the code of the service (e.g., into a main branch) to enable the release pipelines 10, 12 to catchup and reduce risk of developing against a code base that has not been validated in production. For example, different branches of the code for the service may include different changes of the code and the action 36 blocks the integration of the different changes of the code from the different branches into a main branch of the code for the service. The health monitoring model 104 may maintain the gates preventing additional releases 14, 22 on the release pipelines 10, 12 until an indication is received that the services are fixed provided by the release pipelines 10, 12 or that the release pipelines 10, 12 are operating healthy (e.g., as expected with the health metrics 30, 32 within the thresholds 34) to prevent errors from being propagated.

Another example action 36 includes an alert with a notification indicating that the release pipelines 10, 12 are healthy in response to determining that the health metrics 30, 32 indicate that the release pipelines 10, 12 are healthy.

The health monitoring model 104 may consistently calculate the health metrics 30, 32 from the telemetry data 20, 28 obtained from the release pipelines 10, 12 and evaluate the overall health of the release pipelines 10, 12. The actions 36 triggered in response to the evaluation of the health metrics 30, 32 may be used to influence or change how an engineering team is delivering code in production for a given release pipeline 10, 12 to the devices 106, 108. For example, if the health metrics 30 indicate that the release pipeline 10 is operating poorly, the engineering teams may use the actions 36 to prioritize fixing the service provided by the release pipeline 10 before sending any additional release instances 16 of the release 14. In addition, if the health metrics 32 indicate that the release pipeline 12 is operating correctly, the release pipeline 12 may continue to provide the release 22 while the service is being fixed.

In some implementations, one or more computing devices are used to perform the processing of the environment 100. The one or more computing devices may include, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the release platform 102 and/or the health monitoring model 104 are implemented wholly on the same computing device. Another example includes one or more subcomponents of the release platform 102 and/or the health monitoring model 104 implemented across multiple computing devices. Moreover, in some implementations, the release platform 102 and/or the health monitoring model 104 are implemented or processed on different server devices of the same or different cloud computing networks. Moreover, in some implementations, the features and functionalities are implemented or processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

The environment 100 provides a wholistic view of the health of the release pipelines 10, 12 for the various releases 14, 22. The health monitoring model 104 consolidates the monitoring of the release pipelines 10, 12 and provides automated actions 36 in response to the health metrics 30, 32 indicating that one or more release pipelines 10, 12 are unhealthy so that engineering teams do not have to manually check the status of the release pipelines 10, 12.

Figure 2:
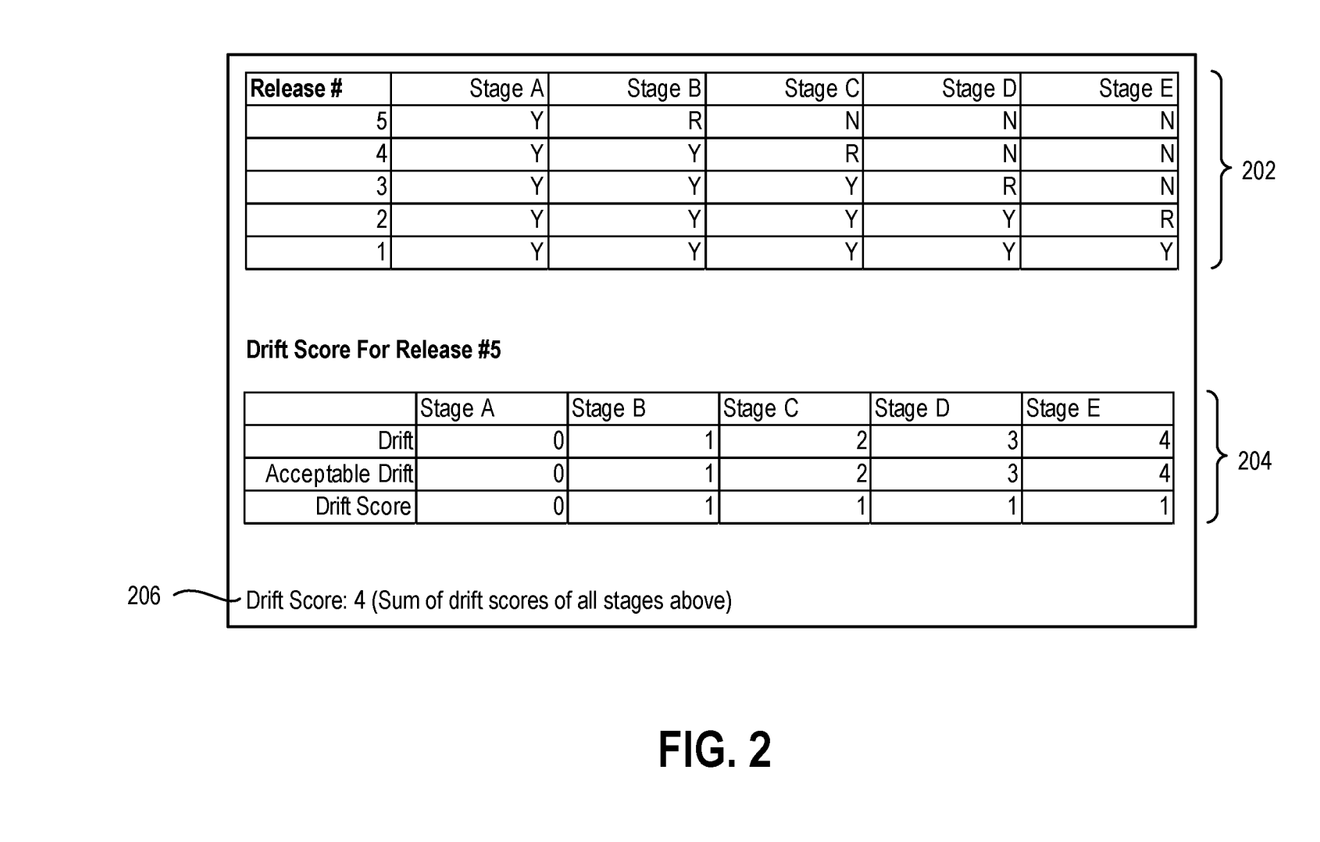
FIG. 2 illustrates an example release pipeline and an example drift score for a release pipeline in accordance with implementations of the present disclosure.

Referring now to FIG. 2, illustrated is an example table 202 for a release pipeline (e.g., release pipeline 10, 12 (FIG. 1)) with different releases (Release 1, Release 2, Release 3, Release 4, Release 5). The table 202 includes the different releases (Release 1, Release 2, Release 3, Release 4, Release 5) and the stages (Stage A, Stage B, Stage C, Stage D, Stage E) for the releases. One example includes Release 1 providing a new feature for a product or service and the different stages are the various geographic regions receiving the new feature. Another example includes Release 3 providing a bug fix for a product or service and the different stages are the various geographic regions receiving the bug fix.

The table 202 illustrates the status of each stage for each release based on the telemetry data generated by the release pipelines. For example, the telemetry data includes the status of each stage (e.g., completed, running, not started). The Release 1 has all stages completed, as indicated by the "Y" for each stage in the row of the table 202 for the Release 1. The Release 2 has four stages completed (Stages A, B, C, and D) and one stage running (Stage E), as indicated by the "Y" and "R" under the different stages in the row of the table 202 for the Release 2. The Release 3 has three stages completed (Stages A, B, and C), one stage running (Stage D), and one stage the release has not started (Stage E), as indicated by the "Y", "R", and "N" under the different stages in the row of the table 202 for the Release 3. The Release 4 has two stages completed (Stage A and Stage B), one stage running (Stage C), and two stages not started (Stage D and Stage E) as indicated by the "Y", "R", and "N" under the different stages in the row of the table 202 for the Release 4. The Release 5 has one stage completed (Stage A), one stage running (Stage B), and three stages not started (Stages A, D, and E), as indicated by the "Y", "R", and "N" under the different stages in the row of the table 202 for the Release 5.

The health monitoring model 104 (FIG. 1) may calculate health metrics (e.g., health metrics 30, 32) using the telemetry data provided in the table 202 for the different releases (Release 1, Release 2, Release 3, Release 4, Release 5). One example health metric calculated by the health monitoring model 104 is the drift score 206 for Release 5.

The table 204 illustrates the different calculations the health monitoring model 104 used in determining the drift score 206 for Release 5. The health monitoring model 104 calculates the drift for each stage (Stage A, Stage B, Stage C, Stage D, Stage E) for the Release 5. The health monitoring model 104 also calculates the acceptable drift for each stage for the Release 5. In addition, the health monitoring model 104 calculates the drift score for each stage for the Release 5. In some implementations, the health monitoring model 104 uses the equations discussed in FIG. 1 for calculating the drift, the acceptable drift, and the drift score. The health monitoring model 104 sums the drift scores of all of the stages to determine the drift score 4 for the Release 5.

In some implementations, the health monitoring model 104 compares the drift score 206 for the Release 5 to different thresholds 34 (FIG. 1) to determine whether the Release 5 is behind or operating as expected (e.g., the previous updates and/or changes to the product have been received by the devices (e.g., devices 106, 108 (FIG. 1) and the product is up to date). For example, if the threshold 34 is 2, the health monitoring model 104 determines that the drift score 4 exceeds the threshold 34 and that the previous updates and/or changes for the product are not being received. The health monitoring model 104 may determine that the release pipeline is not operating as expected (e.g., is unhealthy) and may automatically trigger one or more actions 36 (e.g., send an alert or prevent further updates from occurring) in response to determining that the drift score 206 exceeds the threshold 34.

Figure 3A:
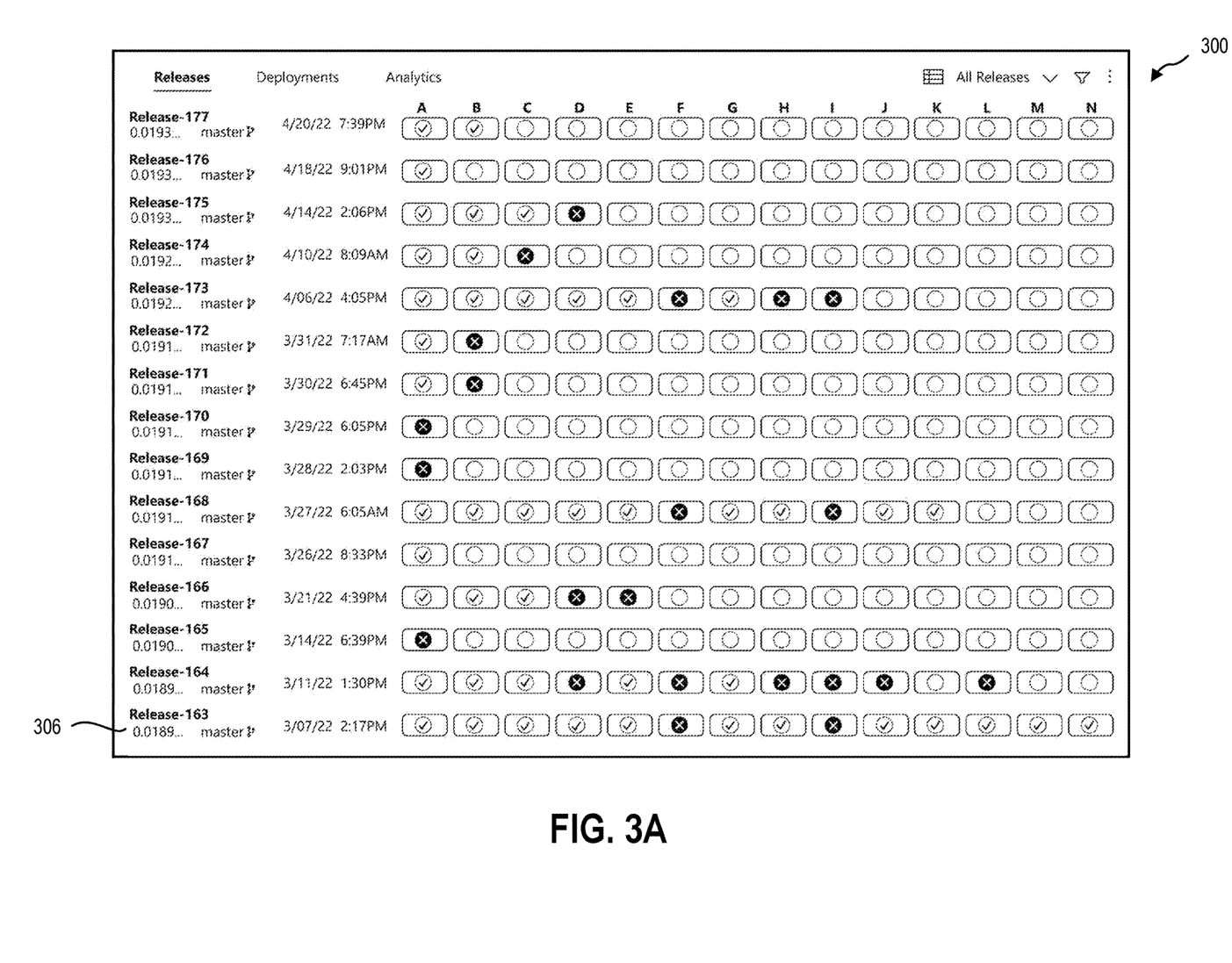
FIG. 3A illustrates an example release pipeline in accordance with implementations of the present disclosure.

Referring now to FIG. 3A, illustrated is an example table 300 for a release pipeline (e.g., release pipelines 10, 12 (FIG. 1)) illustrating the different releases (Release 163, Release 164, Release 165, Release 166, Release 167, Release 168, Release 169, Release 170, Release 171, Release 172, Release 173, Release 174, Release 175, Release 176, Release 177) of the release pipeline. The release pipeline includes 14 stages (Stage A, Stage B, Stage C, Stage D, Stage E, Stage F, Stage G, Stage H, Stage I, Stage J, Stake K, Stage L, Stage M, Stage N) where Stage A is a test stage. The table 300 illustrates the different telemetry data (e.g., telemetry data 20, 28 (FIG. 1)) provided by the release pipelines (e.g., release pipelines 10, 12) during the execution of the different releases. Examples of the telemetry data in the table 300 includes the check mark indicating that the stage was successful, the "X" indicating that the stage was unsuccessful, and/or the start time and date for each release.

The health monitoring model 104 (FIG. 1) calculates different health metrics (e.g., health metrics 30, 32 (FIG. 1)) for the telemetry data provided in the table 300 for the different releases. The health metrics calculated by the health monitoring model 104 may include throughput, drift score, success rate, and the latency. The health monitoring model 104 may use the equations discussed in FIG. 1 in calculating the health metrics.

In the example illustrated in the table 300, the Release 163 is the base release (the first release provided by the release pipeline) and has succeed for all the stages (from Stage A to Stage N). The health monitoring model 104 calculates the throughput as 1 for the example use case since there is only 1 release instance (Release 163) that made it to the last stage (Stage N) of the release pipeline.

Example health metrics calculated for the Release 163 by the health monitoring model 104 also include the success rate and the latency. The drift score is unavailable for the Release 163 because the Release 163 is the first release. The health monitoring model 104 calculates the success rate by dividing the total number of successful stages by the total number of stages. For example, the table 300 indicates that 2 stages failed ("X") and that 12 stages are successful (checkmarks) for the Release 163. The health monitoring model 104 calculates the success rate as 0.85 (12 successful stages divided by 14 the total number of stages). The health monitoring model 104 calculates the latency in hours based on when the first sage (Stage A) started and when the last stage (Stage N) completed. For example, the Stage A started on 3/7 at 1:00 pm PST and the Stage N completed on 3/20 at 7:00 pm PST. The health monitoring model 104 calculates the latency as 318 hours (13 days from 3/7 to 3/20 plus 6 hours). The duration of time for the latency may be set as hours, days, and/or minutes.

Figure 3B:
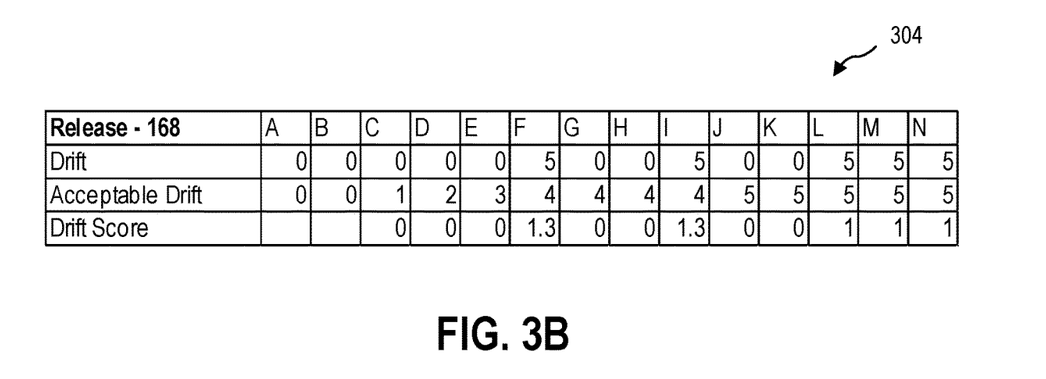
FIGS. 3B-3D illustrate example drift scores for a release pipeline in accordance with implementations of the present disclosure.

Example health metrics calculated for the Release 168 include the drift score and the success rate. The latency is unavailable for the Release 168 since the Release 168 did not reach the last stage (Stage N) of the release pipeline. FIG. 3B illustrates an example table 304 with the drift scores of each stage from A to N. For example, the health monitoring model 104 may calculate the drift score for the Release 168 as 5.6. The health monitoring model 104 may use the equations discussed in FIG. 1 to calculate the drift, the acceptable drift, and the drift score for the Release 168.

Referring to FIG. 3A, the table 300 indicates that 2 stages failed ("X") and that 9 stages are successful (checkmarks) for the Release 168. The health monitoring model 104 calculates the success rate as 0.82 (9 successful stages divided by 11 the total number of stages).

Figure 3C:
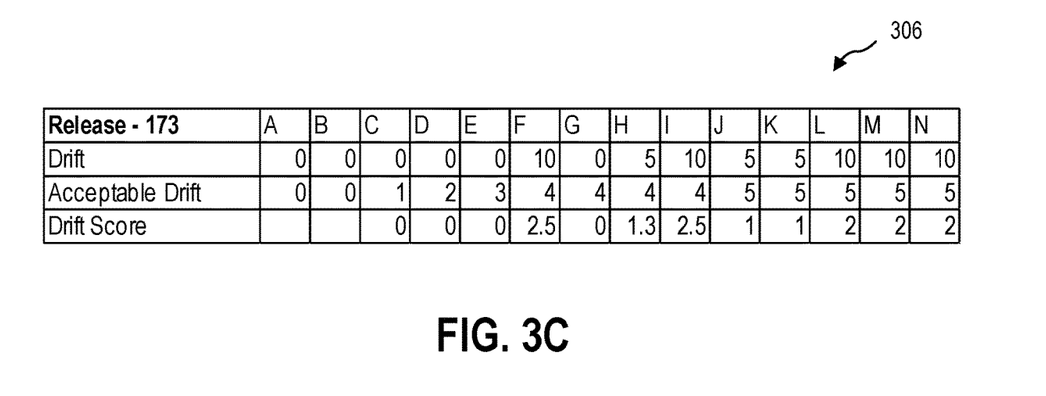

Example health metrics calculated for the Release 173 include the drift score and the success rate. The latency is unavailable for the Release 173 because the Release 173 did not reach the last stage (Stage N) of the release pipeline. FIG. 3C illustrates an example table 306 with the drift scores of each stage from A to N. For example, the health monitoring model 104 may calculate the drift score for the Release 173 as 14.3. The health monitoring model 104 may use the equations discussed in FIG. 1 to calculate the drift, the acceptable drift, and the drift score for the Release 173.

Referring to FIG. 3A, the table 300 indicates that 3 stages failed ("X") and that 6 stages are successful (checkmarks) for the Release 173. The health monitoring model 104 calculates the success rate as 0.67 (6 successful stages divided by 9 the total number of stages).

Figure 3D:
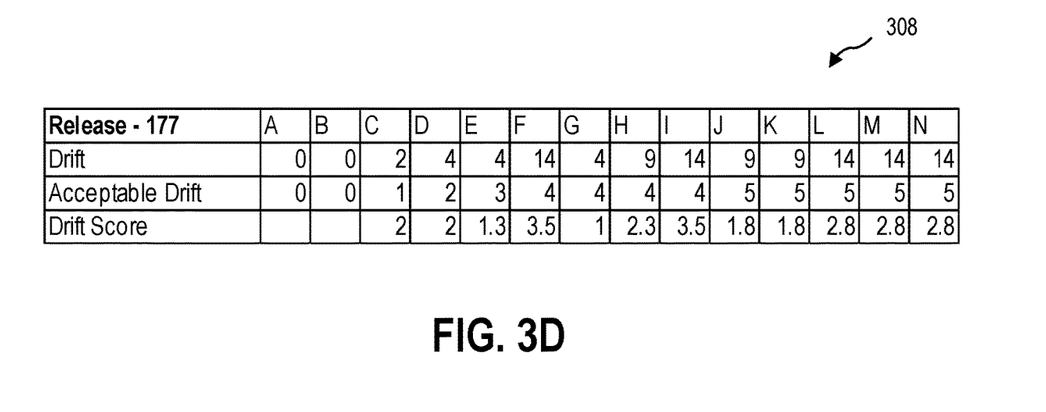

Example health metrics calculated for the Release 177 include the drift score. The latency is unavailable for the Release 177 because the Release 177 did not reach the last stage (Stage N) of the release pipeline. The success rate is not available for the Release 177 because there is an ongoing deployment on Stage C. For example, the health monitoring model 104 may calculate the drift score for the Release 177 as 27.6. FIG. 3D illustrates an example table 308 with the drift scores of each stage from A to N. The health monitoring model 104 may use the equations discussed in FIG. 1 to calculate the drift, the acceptable drift, and the drift score for the Release 177.

Referring to FIG. 3A, the health monitoring model compares the calculated health metrics to different thresholds 34 (FIG. 1) to determine whether the release pipeline is healthy or unhealthy (e.g., whether the release pipeline is operating as expected).

For example, if the threshold 34 for the success rate is 0.9, the threshold 34 for the drift score is 5, and the threshold 34 for the latency is 200 hours, the health monitoring model 104 compares the calculated health metrics for the success rates, the drift scores, and the latency to the different thresholds 34 and determines that the release pipeline is unhealthy. One example includes the latency (318 hours) exceeding the threshold of 200 hours and the health monitoring model 104 determining that the release pipeline is too slow in completing the stages of the release pipeline. Another example includes the drift scores (5.5, 14.25, and 27.58) exceeding the threshold of 5 and the health monitoring model 104 determining that the release pipeline is behind in providing the latest updates and/or changes to the products or services. Another example includes the success rates (0.85, 0.82, 0.67) are below the threshold of 0.9 and the health monitoring model 104 determining that the release pipeline is not completing enough stages in the releases. The health monitoring model 104 determines that the release pipeline is not operating as expected (e.g., is unhealthy) and automatically triggers one or more actions 36 (e.g., send an alert or prevent further updates from occurring) in response to the comparison of the health metrics to the thresholds.

Figure 4:
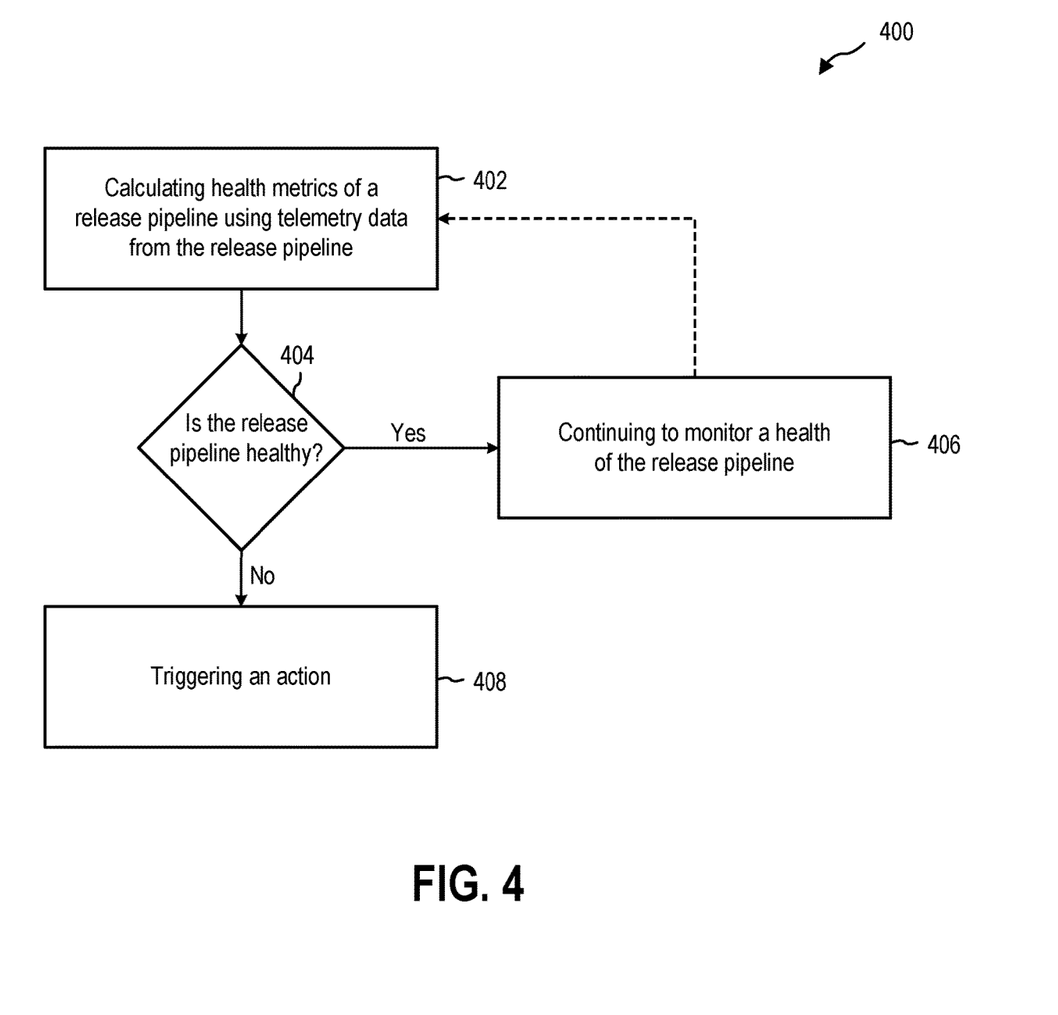
FIG. 4 illustrates an example method for monitoring a release pipeline in accordance with implementations of the present disclosure.

Referring now to FIG. 4, illustrated is an example method 400 for monitoring a release pipeline. The actions of the method 400 are discussed below with reference to the architecture of FIG. 1.

At 402, the method 400 includes calculating health metrics of a release pipeline using telemetry data from the release pipeline. The release pipeline (e.g., the release pipelines 10, 12) executes a release (e.g., the release 14, 22) and the telemetry data (e.g., the telemetry data 20, 28) is obtained during the execution of the release (e.g., the release 14, 22) by the release pipeline (e.g., the release pipelines 10, 12). For example, the telemetry data (e.g., the telemetry data 20, 28) indicates a start time of the release 14, 22 and an end time of the release 14, 22. Another example of the telemetry data 20, 28 includes success and/or failure telemetry data of the release 14, 22.

The health monitoring model 104 calculates one or more health metrics (e.g., the health metrics 30, 32) of the release pipeline (e.g., the release pipeline 10, 12) using the telemetry data (e.g., the telemetry data 20, 28). The health metrics 30, 32 provide different information that is used to determine an overall health of the release pipelines 10, 12.

One example of the health metric (e.g., the health metrics 30, 32) includes a latency of a release (e.g., the release 14, 22) that provides a duration in time for a release instance (e.g., the release instance 16, 24) of the release (e.g., the release 14, 22) to go from a test stage to a last stage of the release pipeline (e.g., the release pipeline 10, 12). Another example health metric (e.g., the health metrics 30, 32) includes a success rate of a release (e.g., the release 14, 22) in the release pipeline (e.g., the release pipeline 10, 12) based on a total number of successful stages in the release (e.g., the release 14, 22) relative to a total number of stages in the release (e.g., the release 14, 22).

Another example health metric (e.g., the health metrics 30, 32) includes a throughput of the release pipeline (e.g., the release pipeline 10, 12) based on a number of release instances (e.g., the release instances 16, 24) of a release (e.g., the release 14, 22) that complete a last stage of the release pipeline (e.g., the release pipeline 10, 12). Another example health metric (e.g., the health metrics 30, 32) includes a drift score of the release pipeline (e.g., the release pipeline 10, 12) that identifies a recency of a release instance (e.g., the release instance 16, 24).

At 404, the method 400 includes determining whether the release pipeline is healthy based on the health metrics. The health monitoring model 104 determines whether the release pipeline (e.g., the release pipeline 10, 12) is healthy based on the health metrics (e.g., the health metrics 30, 32). A healthy release pipeline 10, 12 is a release pipeline 10, 12 that is operating at or above an expected level. An unhealthy release pipeline 10, 12 is a release pipeline 10, 12 that is not operating as expected.

In some implementations, the health monitoring model 104 compares the health metrics (e.g., the health metrics 30, 32) to one or more thresholds (e.g., the threshold 34) to determine whether the release pipeline (e.g., the release pipelines 10, 12) is healthy. The thresholds (e.g., the thresholds 34) are used by the health monitoring model 104 to determine whether the release pipeline (e.g., the release pipelines 10, 12) is operating as expected.

In some implementations, if the health metrics (e.g., the health metrics 30, 32) are below or equal to the thresholds (e.g., the thresholds 34), the health monitoring model 104 determines that the release pipeline (e.g., the release pipelines 10, 12) is operating as expected (e.g., the latest versions of the service or product is being released by the release pipeline to the devices 106, 108). For example, the health monitoring model 104 determines that the release pipeline (e.g., the release pipeline 10, 12) is healthy in response to the health metrics (e.g., the health metrics 30, 32) being below the threshold (e.g., the threshold 34).

In some implementations, if the health metrics (e.g., the health metrics 30, 32) are below the thresholds (e.g., the thresholds 34), the health monitoring model 104 determines that the release pipeline (e.g., the release pipelines 10, 12) is unhealthy and not operating as expected (e.g., the latest versions of the service or product is not being released by the release pipeline to the devices 106, 108). For example, the health monitoring model 104 determines that the release pipeline (e.g., the release pipeline 10, 12) is unhealthy in response to the throughput health metric being below the threshold (e.g., the threshold 34).

In some implementations, if the health metrics (e.g., the health metrics 30, 32) are above the thresholds (e.g., the thresholds 34), the health monitoring model 104 determines that the release pipeline (e.g., the release pipelines 10, 12) is operating as expected. In some implementations, if the health metrics (e.g., the health metrics 30, 32) are equal to the thresholds (e.g., the thresholds 34) or exceeds the thresholds (e.g., the thresholds 34), the health monitoring model 104 determines that the release pipeline (e.g., the release pipelines 10, 12) is unhealthy and not operating as expected. For example, the health monitoring model 104 determines that the release pipeline (e.g., the release pipeline 10, 12) is unhealthy in response to the latency health metrics exceeding the threshold (e.g., the threshold 34).

At 406, the method 400 includes continuing to monitor a health of the release pipeline in response to determining the release pipeline is healthy. The health monitoring model 104 continues to monitor the health of the release pipeline (e.g., the release pipelines 10, 12) in response to determining that the release pipeline (e.g., the release pipelines 10, 12) is healthy. The method 400 may return to 402 and repeat.

At 408, the method 400 includes triggering an action in response to determining that the release pipeline is unhealthy. The health monitoring model 104 triggers one or more actions 36 in response to determining that the release pipeline (e.g., the release pipeline 10, 12) is unhealthy. In some implementations, the action 36 is automatically sending an alert with a notification that the release pipeline (e.g., the release pipeline 10, 12) is unhealthy. In some implementations, the action 36 is automatically preventing additional releases from being executed by the release pipeline (e.g., the release pipeline 10, 12). In some implementations, the actions 36 are automatically performed by the health monitoring model 104 or other systems in the environment 100. As such, the health monitoring model 104 may leverage the health metrics 30, 32 to trigger autonomous actions 36 on the release pipelines 10, 12.

The method 400 may be used to consistently calculate the health metrics (e.g., the health metrics 30, 32) from the telemetry data (e.g., the telemetry data 20, 28) obtained from the release pipeline (e.g., the release pipeline 10, 12) and evaluate the overall health of the release pipeline (e.g., the release pipeline 10, 12). The actions (e.g., the actions 36) triggered in response to the evaluation of the health metrics (e.g., the health metrics 30, 32) may be used to influence or change how an engineering team is delivering code in production for a given release pipeline (e.g., the release pipeline 10, 12) to the devices (e.g., the devices 106, 108).

Figure 5:
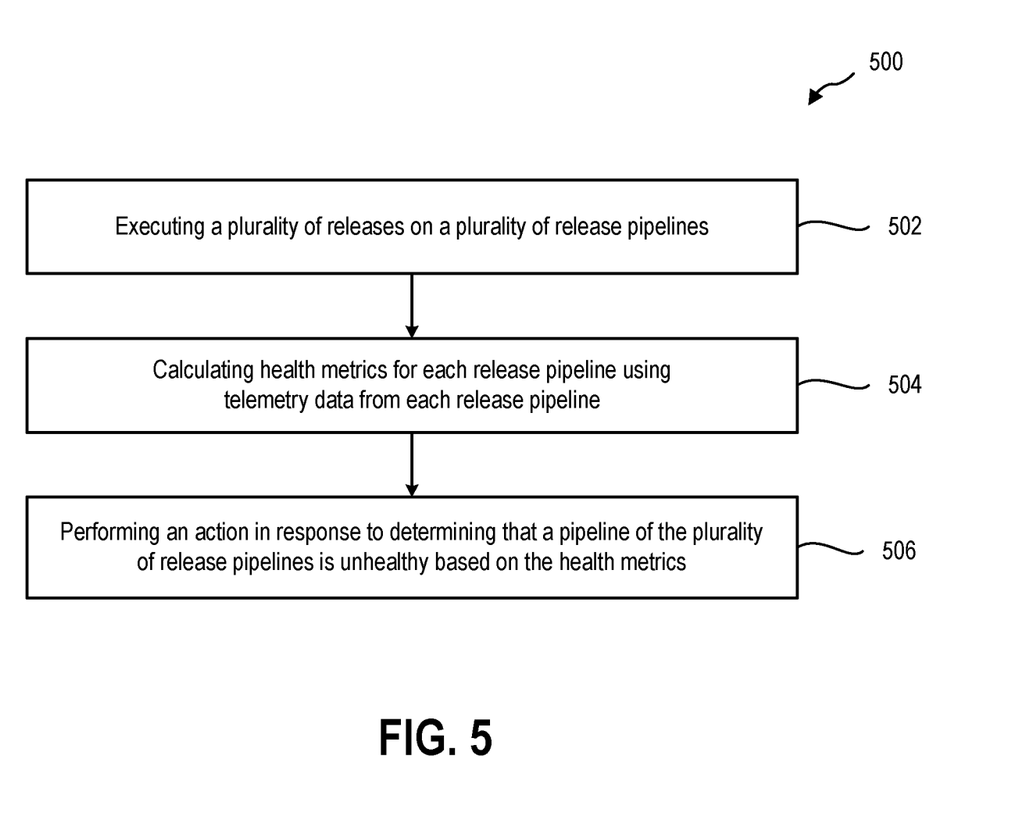
FIG. 5 illustrates an example method for monitoring a plurality of release pipelines in accordance with implementations of the present disclosure.

Referring now to FIG. 5, illustrated is an example method 500 for monitoring a plurality of release pipelines. The actions of the method 500 are discussed below with reference to the architecture of FIG. 1.

At 502, the method 500 includes executing a plurality of releases on a plurality of release pipelines, respectively. A release platform 102 includes a plurality of release pipelines 10, 12 to provide releases 14, 22 for a service or product to one or more devices (e.g., the devices 106, 108).

Each release pipeline of the plurality of release pipelines 10, 12 corresponds to a separate release of the plurality of releases 14, 22. In addition, each release 14, 22 includes a plurality of stages (e.g., the stages 18, 26). Each service or product may include a plurality of releases 14, 22.

At 504, the method 500 includes calculating health metrics for each release pipeline using telemetry data from the respective release pipeline. The telemetry data 20, 28 is obtained during an execution of each release (e.g., the releases 14, 22). The telemetry data 20, 28 is emitted from the release pipelines 10, 12 during an execution of the releases 14, 22. The telemetry data 20, 28 provides information for the releases 14, 22. In some implementations, the telemetry data 20, 28 is captured by the release platform 102. In some implementation, the telemetry data 20, 28 is captured by the health monitoring model 104. For example, the telemetry data 20, 28 indicates a start time of the release 14, 22 and an end time of the release 14, 22. Another example of the telemetry data 20, 28 includes a total number of the stages 18, 26 in the release 14, 22. Another example of the telemetry data 20, 28 includes whether the stages 18, 26 completed successfully or the stages 18, 26 are not completed.

The telemetry data 20, 28 is provided to the health monitoring model 104 that calculates health metrics 30, 32 for the release pipelines 10, 12 using the telemetry data 20, 28. The health metrics 30, 32 provide different information that is used to determine an overall health of the release pipelines 10, 12. The health monitoring model 104 may calculate a variety of health metrics 30, 32 of the release pipelines 10, 12 using the telemetry data 20, 28. As such, the telemetry data 20, 28 is used by the health monitoring model 104 to measure a health of the release pipelines 10, 12.

At 506, the method 500 includes performing an action in response to determining that a release pipeline of the plurality of release pipelines is unhealthy based on the health metrics. In some implementations, the health monitoring model 104 compares the health metrics 30, 32 to one or more thresholds 34 to evaluate an overall health of the release pipelines 10, 12. The thresholds 34 may be defined by engineering teams of a product to indicate whether a release 14, 22 is performing as expected (e.g., the latest versions of the service or product are being released by the release pipelines 10, 12 in a timely manner to the devices 106, 108). The thresholds 34 may differ between different products or services. In addition, the thresholds 34 may change for different releases 14, 22. As such, the thresholds 34 may be configurable for each service or product and/or each release 14, 22.

In some implementations, different thresholds 34 are defined for different health metrics 30, 32. For example, one threshold 34 is defined for latency and a different threshold 34 is defined for drift score. In some implementations, a single threshold 34 is defined for an aggregate score of the health metrics 30, 32.

In some implementations, the health metrics 30, 32 include a latency of each release (e.g., the releases 14, 22) and the health monitoring model 104 determines that at least one of the release pipelines 10, 12 is unhealthy by comparing the latency of each release (e.g., the releases 14, 22) to the threshold 34 for the latency and determining that the latency of at least one of the release pipelines 10, 12 exceeds the threshold 34 for the latency.

In some implementations, the health metrics 30, 32 include a success rate of each release (e.g., the releases 14, 22) and the health monitoring model 104 determines that at least one of the release pipelines 10, 12 is unhealthy by comparing the success rate of each release (e.g., the releases 14, 22) to the threshold 34 for the success rate and determining that the success rate of at least one of the release pipelines 10, 12 is below the threshold 34 for the success rate.

In some implementations, the health metrics 30, 32 include a throughput of each release pipeline 10, 12 and the health monitoring model 104 determines that at least one of the release pipelines 10, 12 is unhealthy by comparing the throughput of each release pipeline 10, 12 to the threshold 34 for the throughput and determining that the throughput of at least one of the release pipelines 10, 12 exceeds the threshold 34 for the throughput.

In some implementations, the health metrics 30, 32 include a drift score of each release pipeline 10, 12 and the health monitoring model 104 determines that at least one of the release pipelines 10, 12 is unhealthy by comparing the drift score of each release pipeline 10, 12 to the threshold 34 for the drift score and determining that the drift score of at least one of the release pipelines 10, 12 exceeds the threshold 34 for the drift score.

The health monitoring model 104 may cause one or more actions 36 to be performed in response to the comparison of the health metrics 30, 32 to the thresholds 34 and the health metrics 30, 32 indicating that the release pipelines 10, 12 are unhealthy. In some implementations, the action 36 is automatically sending an alert with a notification identifying which release pipeline of the plurality of release pipelines 10, 12 is unhealthy. In some implementations, the action 36 is automatically preventing additional releases from occurring on the unhealthy release pipelines (e.g., the release pipeline 10, 12) while continuing to execute releases (e.g., the releases 14, 22) on health release pipelines (e.g., the release pipelines 10, 12). As such, the health monitoring model 104 may leverage the health metrics 30, 32 to trigger autonomous actions 36 on the release pipelines 10, 12.

The method 500 may be used to consolidate the monitoring of a plurality of release pipelines 10, 12 and provide automated actions 36 in response to the health metrics 30, 32 indicating that one or more release pipelines 10, 12 are unhealthy so that engineering teams do not have to manually check the status of the release pipelines 10, 12. The method 500 may provide a wholistic view of the health of the plurality of release pipelines 10, 12 for the various releases 14, 22.

Figure 6:
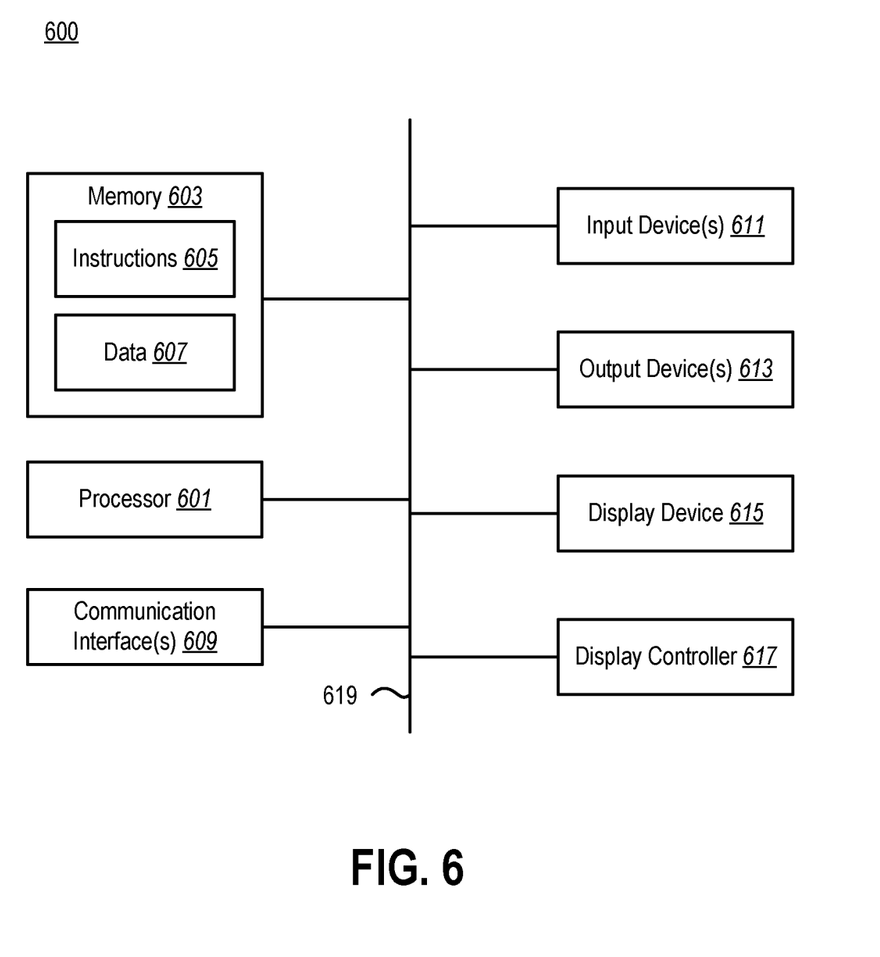
FIG. 6 illustrates components that may be included within a computer system.

FIG. 6 illustrates components that may be included within a computer system 600. One or more computer systems 600 may be used to implement the various methods, devices, components, and/or systems described herein.

The computer system 600 includes a processing system comprising a processor 601. The processor 601 may be a general-purpose single or multi-chip microprocessor (e.g., an Advanced Reduced Instruction Set Computer (RISC) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage mediums, optical storage mediums, flash memory devices in RAM, on-board memory included with the processor, erasable programmable read-only memory (EPROM), electrically EPROM memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetoothwireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

As illustrated in the foregoing discussion, the present disclosure utilizes a variety of terms to describe features and advantages of the model evaluation system. Additional detail is now provided regarding the meaning of such terms.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, implementations of the disclosure can comprise at least two distinctly different kinds of computer-readable mediums: non-transitory computer-readable storage media (devices) and transmission media.

As used herein, non-transitory computer-readable storage mediums (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   calculating health metrics of a release pipeline comprising a stage using telemetry data from the release pipeline, wherein the telemetry data is obtained during execution of a release by the release pipeline and the health metrics include a latency of a release that provides a duration in time for a release instance of the release to go from a test stage through each stage of the release pipeline to a last stage of the release pipeline and a drift score of the release pipeline that identifies a recency of a release instance;
   determining that the release pipeline is unhealthy based on the health metrics indicating the drift score comparing recency of a release instance to a released instance deployed toward a last stage of the release pipeline is above a threshold; and triggering an action in response to determining that the release pipeline is unhealthy.

2. The method of claim 1, wherein the action is sending an alert with a notification that the release pipeline is unhealthy.

3. The method of claim 1, wherein the action is preventing additional releases from being executed by the release pipeline.

4. The method of claim 1, wherein determining that the release pipeline is unhealthy includes comparing the health metrics to a respective threshold.

5. The method of claim 4, wherein if the health metrics is below the respective threshold, determining that the release pipeline is unhealthy.

6. The method of claim 4, wherein if the health metrics is equal to the respective threshold or exceeds the respective threshold, determining that the release pipeline is unhealthy.

7. The method of claim 1, wherein the health metrics include a latency of a release that provides a duration in time for a release instance of the release to go from a test stage to a last stage of the release pipeline.

8. The method of claim 1, wherein the health metrics include a success rate of a release in the release pipeline based on a total number of successful stages in the release relative to a total number of stages in the release.

9. The method of claim 1, wherein the health metrics include a throughput of the release pipeline based on a number of release instances of a release that complete a last stage of the release pipeline.

10. A method, comprising:

executing a plurality of releases on a plurality of release pipelines;

calculating health metrics for each release pipeline using telemetry data from each release pipeline, wherein the health metrics include a latency of a release that provides a duration in time for a release instance of the release to go from a test stage through each stage of the release pipeline to a last stage of the release pipeline and a drift score of the release pipeline that identifies a recency of a release instance; and performing an action in response to determining that a release pipeline of the plurality of release pipelines is unhealthy based on the health metrics indicating the drift score comparing recency of a release instance to a released instance deployed toward a last stage of the release pipeline is above a threshold.

11. The method of claim 10, wherein each release pipeline of the plurality of release pipelines corresponds to a separate release of the plurality of releases.

12. The method of claim 10, wherein each release pipeline includes a plurality of stages for each release of the plurality of releases.

13. The method of claim 10, wherein the telemetry data is obtained during an execution of each release on each release pipeline.

14. The method of claim 10, wherein the health metrics include a latency of each release, and wherein determining that the release pipeline is unhealthy further comprises:

comparing the latency of each release to a threshold for latency; and if the latency of the release pipeline exceeds the threshold for latency, determining that the release pipeline is unhealthy.

15. The method of claim 10, wherein the health metrics include a success rate of each release, and wherein determining that the release pipeline is unhealthy further comprises:

comparing the success rate to a threshold for the success rate; and if the success rate of the release pipeline is below the threshold for the success rate, determining that the release pipeline is unhealthy.

16. The method of claim 10, wherein the health metrics include a throughput of each release pipeline, and wherein determining that the release pipeline is unhealthy further comprises:

comparing the throughput to a threshold for the throughput; and if the throughput of the release pipeline exceeds the threshold for the throughput, determining that the release pipeline is unhealthy.

17. The method of claim 10, wherein the health metrics include a drift score of each release pipeline and determining that the release pipeline is unhealthy further comprises:

comparing the drift score to a threshold for the drift score; and if the drift score of the release pipeline exceeds the threshold for the drift score, determining that the release pipeline is unhealthy.

18. The method of claim 10, wherein the action is sending an alert with a notification identifying which release pipeline of the plurality of release pipelines is unhealthy.

19. The method of claim 10, wherein the action is preventing additional releases from occurring on the release pipeline.

* * * * *